(12) United States Patent
Yasui et al.

(10) Patent No.: US 6,479,952 B2
(45) Date of Patent: Nov. 12, 2002

(54) CRT DISPLAY APPARATUS

(75) Inventors: Hironobu Yasui, Tokyo (JP); Akinori Heishi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/818,782

(22) Filed: Mar. 28, 2001

(65) Prior Publication Data

US 2002/0060752 A1 May 23, 2002

(30) Foreign Application Priority Data

Oct. 20, 2000 (JP) ........................................ 2000-320632

(51) Int. Cl.$^7$ ................................................ G09G 1/04
(52) U.S. Cl. .................... 315/383; 315/381; 315/382; 315/368.15
(58) Field of Search ...................... 315/1, 3, 30, 368.11, 315/368.15, 368.18, 381, 383, 395, 382, 382.1

(56) References Cited

U.S. PATENT DOCUMENTS

| | | | | |
|---|---|---|---|---|
| 4,630,100 A | * | 12/1986 | DelSignore et al. | 348/701 |
| 4,871,949 A | * | 10/1989 | Abramson | 313/409 |
| 5,555,026 A | * | 9/1996 | Lee | 348/380 |
| 5,585,691 A | * | 12/1996 | Washburn | 313/411 |

FOREIGN PATENT DOCUMENTS

JP    11224618    8/1999

* cited by examiner

*Primary Examiner*—Haissa Philogene
(74) *Attorney, Agent, or Firm*—Birch, Stewart, Kolasch & Birch, LLP

(57) ABSTRACT

A display apparatus includes a CRT, the CRT including an electron gun having a cathode, a G1 electrode, a G2 electrode, and a G3 electrode disposed in that order to draw electrons from the cathode. The electron gun further has a modulating Gm electrode disposed between the G2 and G3 electrodes. The display apparatus is provided with a controller for controlling a value of a voltage applied to the Gm electrode to adjust brightness of a picture on a screen of the CRT.

4 Claims, 3 Drawing Sheets

CRT DISPLAY APPARATUS

FIELD OF THE INVENTION

The present invention relates to a display apparatus including a CRT.

BACKGROUND OF THE INVENTION

FIG. 4 shows a structure of a conventional CRT display apparatus. In this figure, there is shown a CRT 14, a cathode 2, a G1 electrode 3, a G2 electrode 4, a G3 electrode 6, an anode 7, a video circuit 9, a flyback transformer (FBT) 15, and a variable resistor 16. The G1, G2, and G3 electrodes are cylindrical-shaped electrodes disposed within the electron gun to draw electrons from the cathode and prefocus them. Another focusing electrode and the like disposed after the G3 electrode are omitted from the drawing to simplify explanation.

The operation of the apparatus of FIG. 4 will be explained below. A video signal is amplified by the video circuit 9, and is supplied to the cathode 2. A high voltage of about 25 KV, which the FBT 15 produces by stepping up and rectifying horizontal flyback pulses generated in a not-illustrated horizontal-deflection-signal output circuit, is applied to the anode 7. The G2 electrode 4 is applied with a voltage of 700V to 1000V which the variable resistor 16 produces by dividing the high voltage. The current flowing through the G2 electrode 4 is very small, and therefore the variable resistor 16 has resistance as much as 100 MΩ. By adjusting the voltage applied to the G2 electrode 4, a coarse adjustment to a threshold point at which electrons start to flow towards a screen and the screen starts to illuminate, which is called a screen adjustment, can be carried out.

Generally, a CRT display apparatus is provided with a facility of adjusting brightness and a facility of adjusting contrast. The brightness adjusting facility enables a user to tune a black level of a picture and the threshold point at which the screen starts to illuminate to his liking. Generally, this brightness adjusting facility is obtained by changing a black bias voltage of a video signal supplied to the cathode. The contrast adjusting facility enables a user to tune the ratio of a brightness of the darkest part to that of the brightest part in the picture to his liking. Generally, this contrast adjusting facility is obtained by changing the amplitude of a video signal supplied to the cathode.

On the other hand, the demand for improving intensity and resolution of a CRT display apparatuses is growing in recent years. Japanese Unexamined Patent Publication No. 11-224618 discloses a high intensity/resolution CRT (referred to as a "Hi-Gm tube" hereinafter) that addresses such a demand. This Hi-Gm tube features a novel electron gun that has, in addition to the G1, G2 and G3 electrodes, a modulating electrode called "Gm electrode" disposed between the G2 electrode and the G3 electrode.

FIG. 5 shows a structure of such an electron gun used for the Hi-Gm tube. In this figure, 17 denotes a G1 electrode, 18 denotes a G2 electrode, 19 denotes a G3 electrode, 20 denotes a cathode, 21 denotes an electron-emitting substance formed on the surface of the cathode, and 22 denotes a Gm electrode. This electron gun has, for the part following the G3 electrode where another focusing electrode and the like are disposed, the same structure as the conventional electron gun.

FIG. 6 is a graph showing potential distribution in the vicinity of the cathode within the electron gun of the Hi-Gm tube.

In this graph, the horizontal axis represents the distance (mm) from the cathode surface, the vertical axis represents the potential (V), and the curve 23 shows the potential distribution symmetrical with the axis of revolution in the vicinity of the cathode. Furthermore, the arrow 24 shows a range within which the Gm electrode 22 exists, which is about 0.5 mm from the cathode surface. The graph of FIG. 6 holds while the G1 electrode is applied with 0V, the G2 electrode is applied with 500V, the G3 electrode is applied with 5.5 KV, the Gm electrode is applied with 80V, and the anode is applied with the high voltage of 25 KV for example.

The potential of the Gm electrode 22 is set to about 80 VDC, so there is a position 25 within the range 24 at which the potential curve 23 is minimum. If the potential of the cathode 20 shown by the broken line is lower than the potential at this position 25, electrons pass through the position 25 and flow towards the screen. If not, electrons do not flow towards the screen since they cannot pass through the position 25.

As seen from this graph, between the cathode 20 and the position 25, electrons always exist abundantly, and the potential slope after the position 25 is of the order of $10^6$ (V/m). Compared with the potential slope between the cathode and the G1 electrode, it is greater by an order of magnitude. Accordingly, after electrons pass through the Gm electrode 22, most of them can move towards the screen without being affected by spatial charges, so the intensity of the electron beam flowing to the screen is determined by the quantity of the electrons that pass through the position 25 at which the spatial potential is minimum.

For this reason, variation of the intensity of the electron beam when the cathode potential is varied by a certain value in the Hi-Gm tube is about twice as much as that in the conventional CRT. That is, the variation of the cathode potential required to vary the intensity of the electron beam by a certain value in the Hi-Gm tube is less than half the variation required in the conventional CRT. In other words, with the Hi-Gm tube, the variation of the intensity of the electron beam can be doubled for the same variation of the cathode potential. Consequently, with the Hi-Gm tube, it is possible to easily adapt to video signals of high frequency, and therefore to provide a display apparatus of high intensity and high resolution.

OBJECT AND SUMMARY OF THE INVENTION

Although it has been described that, in a conventional CRT display apparatus, brightness of a picture is adjusted by changing the value of a black bias voltage supplied to the cathode, it is necessary in reality, to change each of three bias voltages of the three channels of R, G, and B. Furthermore, in the case of adjusting contrast of a picture by changing the amplitude of a video signal supplied to the cathode, to obtain high contrast, expensive amplifiers having a high gain and an expensive power supply outputting a high voltage are required.

An object of the present invention is to provide a display apparatus in which brightness is adjusted by a simple circuit utilizing the above-described characteristics of the Hi-Gm tube. Another object of the present invention is to provide a display apparatus capable of displaying a picture in high contrast at a low cost.

The above-described object is achieved by a CRT display apparatus comprising:

a CRT including an electron gun, the electron gun having a cathode, a G1 electrode, a G2 electrode and a G3 electrode disposed in that order to draw electrons from the cathode, the electron gun further having a modulating Gm electrode disposed between the G2 and G3 electrodes; and a controller for controlling a value of a voltage applied to the Gm electrode to adjust brightness of a picture on a screen of the CRT.

The controller may be a voltage source which produces a voltage having a value corresponding to a value of a brightness adjustment signal input to the voltage source, and applies the produced voltage to the Gm electrode.

The above-described another object is achieved by a CRT display apparatus comprising:

a CRT including an electron gun,
the electron gun having a cathode, a G1 electrode, a G2 electrode and a G3 electrode disposed in that order to draw electrons from the cathode, the electron gun further having a modulating Gm electrode disposed between the G2 and G3 electrodes; and a controller for controlling a value of a voltage applied to the G2 electrode to adjust contrast of a picture on a screen of the CRT.

The controller may be a voltage source which produces a voltage having a value corresponding to a value of a contrast adjustment signal input to the voltage source, and applies the produced voltage to the G2 electrode.

BRIEF DESCRIPTION OF THE DRAWINGS

Embodiments of the invention will now be described by way of example and with reference to the accompanying drawings in which.

DESCRIPTION OF THE PREFERRED EMBODIMENTS

Figure 1:
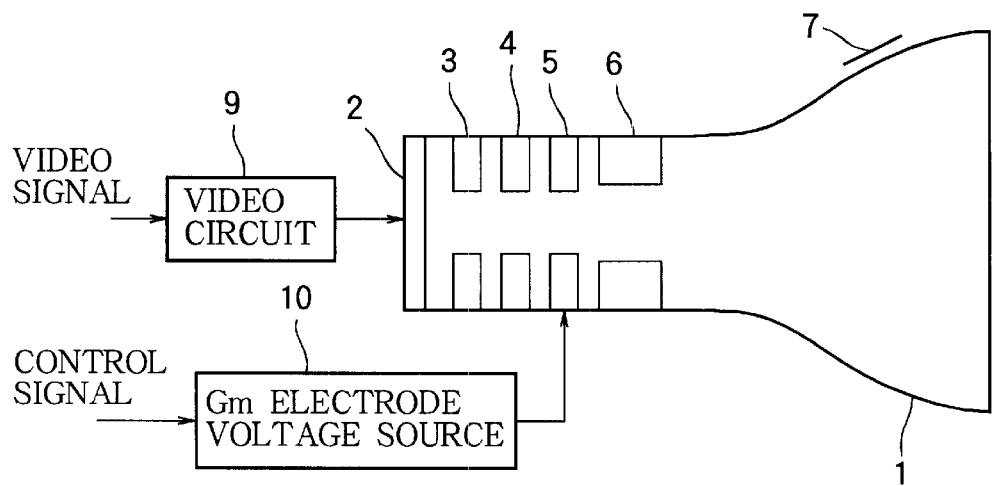
FIG. 1 is a block diagram showing a structure of a first example of the CRT display apparatus according to the invention.
Figure 4:
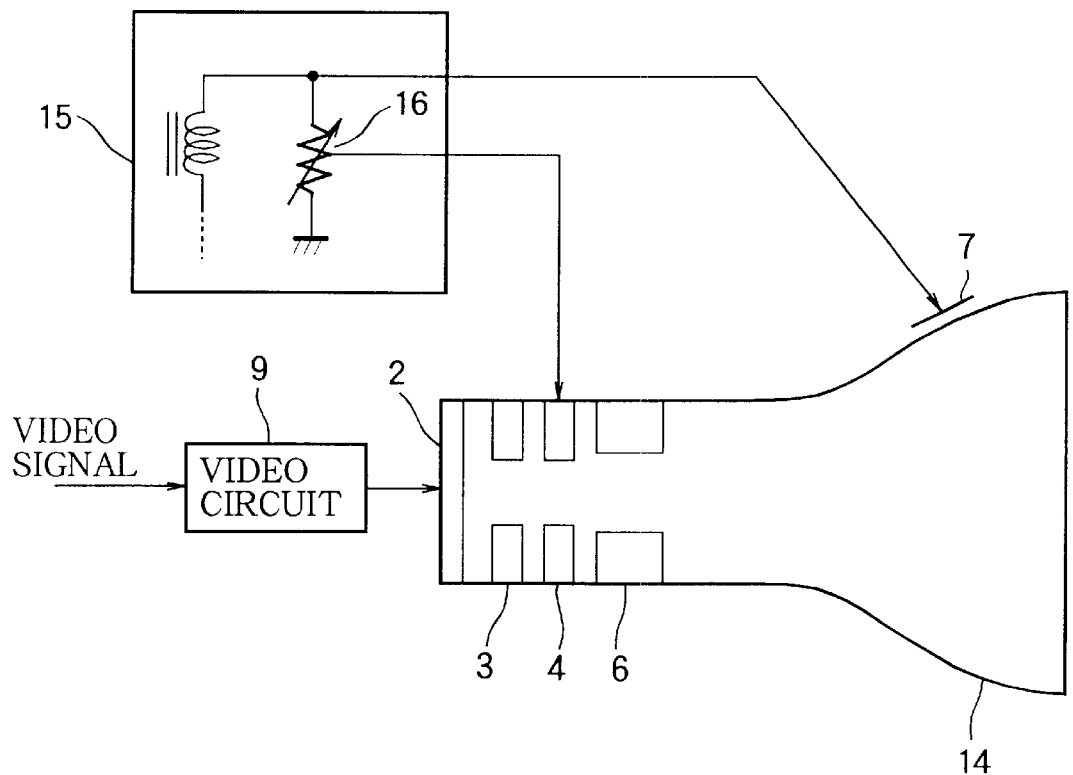
FIG. 4 is a block diagram showing a structure of a conventional CRT display apparatus.
Figure 5:
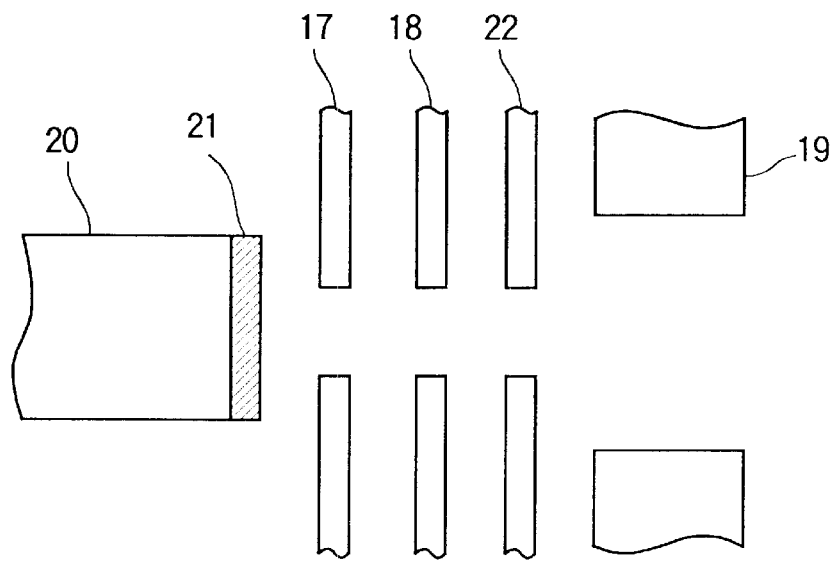
FIG. 5 is an explanatory view of a structure of an electron gun in the vicinity of a cathode of a Hi-Gm tube.
Figure 6:
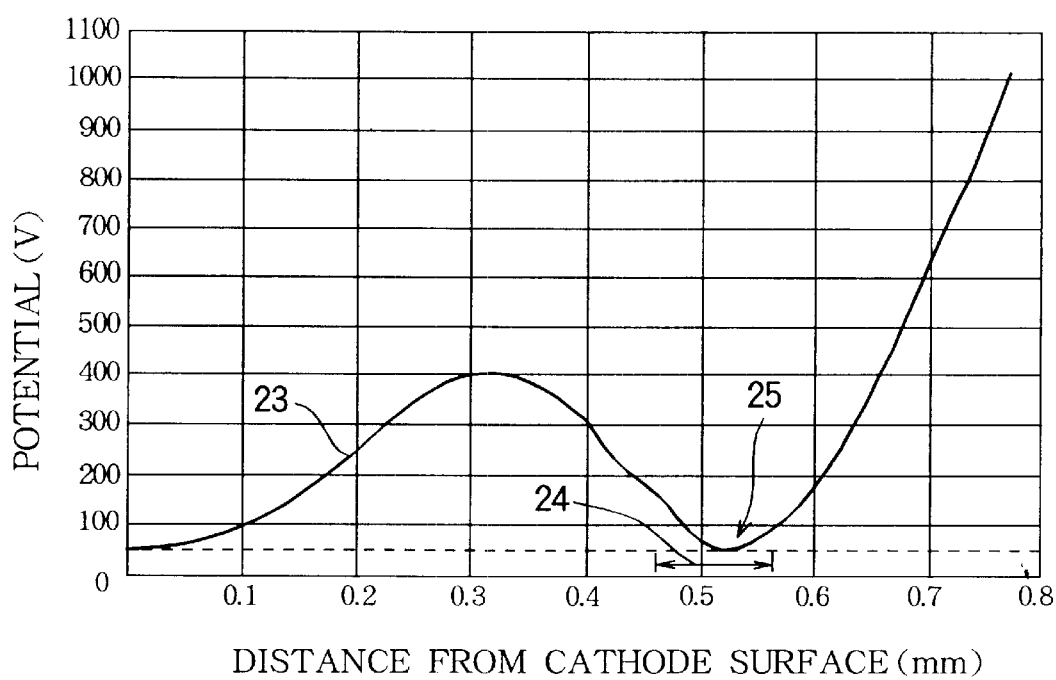
FIG. 6 is a graph showing potential distribution in the vicinity of the cathode within the electron gun of the Hi-Gm tube.

FIG. 1 is a block diagram showing the structure of a first example of the CRT display apparatus according to the present invention. Here, the "CRT display apparatus" means a display apparatus using a CRT, such as a television set or a monitor display for a personal computer. In this figure, reference numerals identical to those in FIG. 4 represent the same or equivalent elements.

In FIG. 1, there is shown a Hi-Gm tube 1, a cathode 2, a G1 electrode 3, a G2 electrode 4, a Gm electrode 5, a G3 electrode 6, an anode 7, a video circuit 10, and a Gm electrode power source 10. Another focusing electrode and the like disposed after the G3 electrode are omitted from the drawing to simplify explanation.

A video signal is inverted and amplified by the video circuit 9, and is supplied to the cathode 2. The Gm electrode voltage source 10 produces a voltage to be applied to the Gm electrode 5. This voltage source 10 is configured to produce a voltage having a value in accordance with a value of an after-described control signal which is input to this voltage source 10. In this first example, the G1 electrode 3 is applied with 0V, the G2 electrode 4 is applied with 500V, the G3 electrode 6 is applied with 5.5 KV, the Gm electrode 5 is applied with 80V, and the anode 7 is applied with the high voltage of 25 KV.

The voltage applied to the Gm electrode 5 defines a threshold point at which electrons start to flow towards the screen causing the screen to illuminate. When the cathode voltage falls below the voltage of the Gm electrode 5, an electron beam starts to flow, and thereby electrons hit the fluorescent substance of the screen causing the screen to illuminate. In the Hi-Gm tube, it is possible to match the point at which the screen starts to illuminate to the black level of a picture by equalizing the black bias voltage supplied to the cathode to the voltage of the Gm electrode.

In a case where black sinks too much and therefore the picture is dark as a whole and is not easy to see, a control signal input into the Gm electrode voltage source 10 is increased to raise the voltage applied to the Gm electrode 5. As a result, the voltage corresponding to the point at which the screen starts to illuminate increases, and thereby the picture brightens, or brightness, is increased. On the other hand, in a case where black is elevated too high and therefore the picture is lax, the control signal is reduced to lower the voltage applied to the Gm electrode 5. This control signal may be a voltage signal output from an output port of a microcomputer when a user presses a key to adjust brightness, viewing a user-adjustment menu which is generated by a character generator or the like and displayed on the monitor screen. This control signal may be generated by other means such as a hardware including a microcomputer and switches, or software-based processing.

In the conventional CRT display apparatus, brightness adjustment is achieved by varying the three cathode bias voltages of the three channels of R, G, B in a like manner, whereas in this example, brightness adjustment is achieved by just varying the voltage applied to the Gm electrode, which simplifies its circuit structure.

Figure 2:
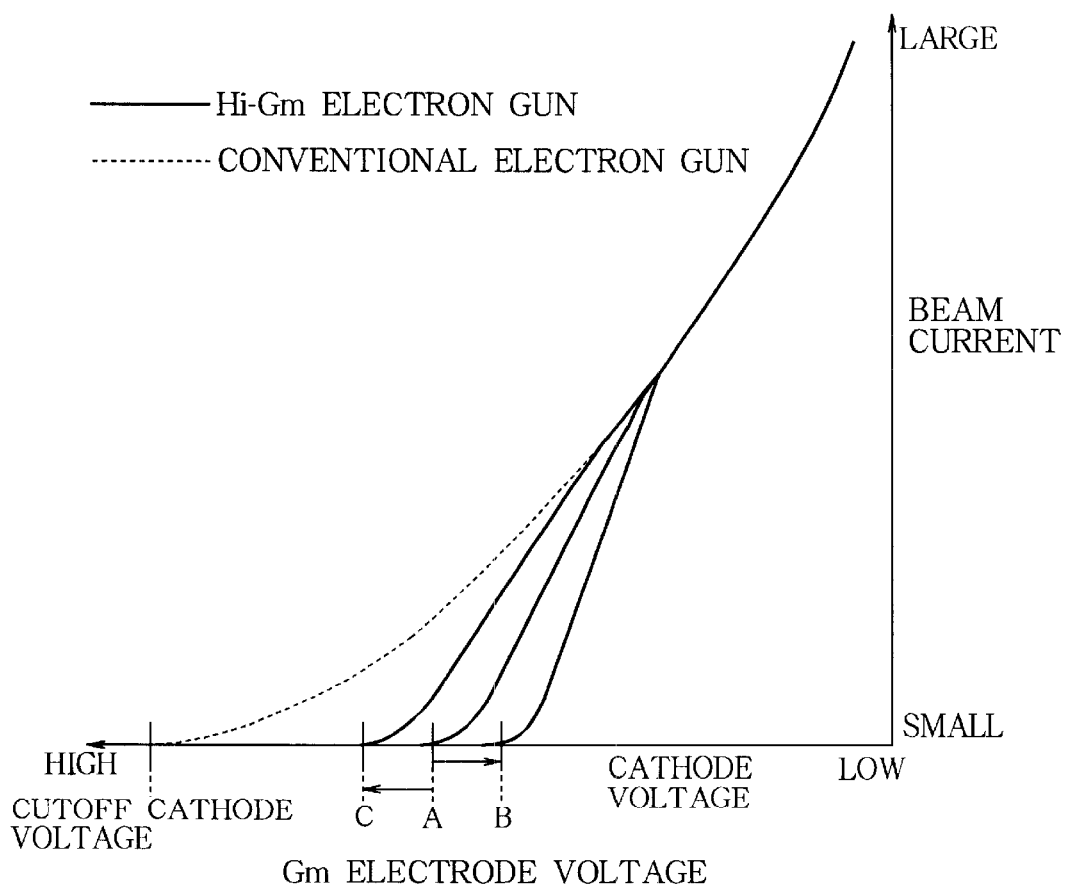
FIG. 2 is a graph showing a cathode voltage-beam current characteristic of a CRT.

FIG. 2 is a graph showing typical cathode voltage-beam current characteristics of CRTs. In this graph, the solid line represents a characteristic of a Hi-Gm tube and the dotted line represents a characteristic of a conventional CRT.

As shown in this graph, in the case of the Hi-Gm tube, if the voltage applied to the Gm electrode is set to A, no beam current flows while the cathode voltage is above A, and when the cathode voltage falls below A, a beam current starts to flow, and increases approaching the characteristic of the conventional CRT as the cathode voltage lowers.

Here, if the voltage applied to the Gm electrode is lowered from A to B, a point at which the screen starts to illuminate, or a black level goes down for the same video signal supplied to the cathode. At this moment, the beam current curve is steepened at its rising part. In consequence, a feeling of contrast having been enhanced in a mid-brightness range is obtained. On the other hand, if the voltage applied to the Gm electrode is raised from A to C, the black level goes up for the same video signal supplied to the cathode. In this case, the beam current curve is made gentle at its rising part. In consequence, a feeling of contrast having been declined in a mid-brightness range is obtained.

As described above, lowering the Gm electrode voltage brings about the effect of contrast enhancement. In this case, however, since the black level goes down, black sinks or a picture is darkened. To cope with this, it is possible to readjust the black level by lowering the cathode bias voltage as conventional brightness adjustment. Likewise, in the case of raising the Gm electrode voltage to obtain the effect of contrast decline, it is possible to readjust the black level by raising the cathode bias voltage.

As described above, the brightness adjustment through the control over the Gm electrode presents a novel image-quality-adjustment effect since brightness variation by this brightness adjustment involves contrast variation in a mid-brightness range.

Figure 3:
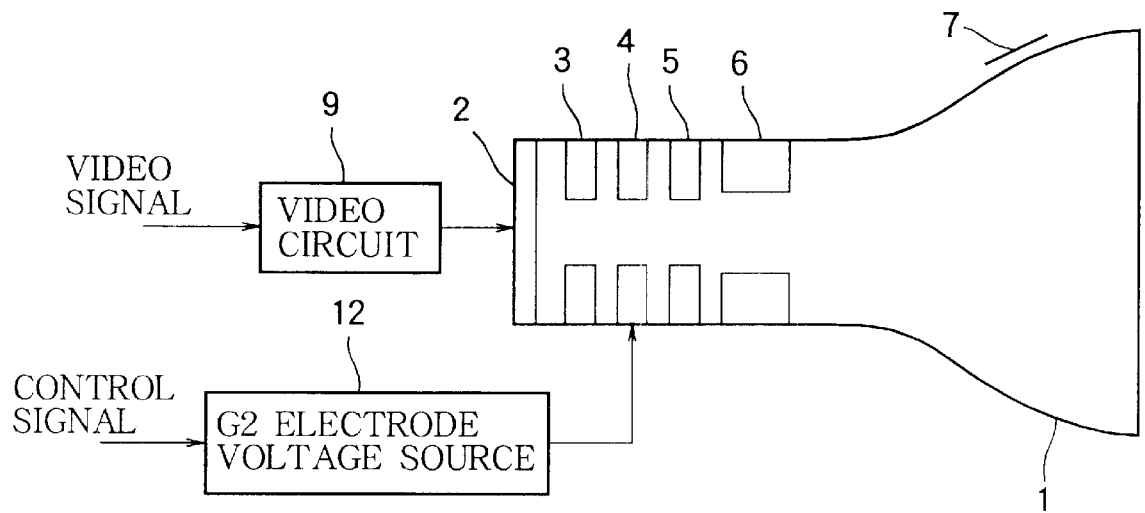
FIG. 3 is a block diagram showing a structure of a second example of the CRT display apparatus according to the invention.

FIG. 3 is a block diagram showing a structure of a second example of the CRT display apparatus according to the present invention. Here, the "CRT display apparatus" means a display apparatus using a CRT, such as a television set or a monitor display for a personal computer. In this figure, reference numerals identical to those in FIG. 1 represent the same elements. The second example differs from the first example in that the control signal is input into a G2 electrode voltage source 12 and not into the Gm electrode voltage source 10. The G2 electrode voltage source 12 is configured to produce a voltage having a value in accordance with a value of the control signal input thereto.

As previously described, in a display apparatus having a conventional CRT, a coarse adjustment to a threshold point (cutoff point) with respect to the cathode voltage at which the screen starts to illuminate, which is called a screen adjustment, is carried out by adjusting a voltage applied to the G2 electrode. And, a fine adjustment to the cutoff point is carried out by adjusting a black bias voltage supplied to the cathode.

In a conventional CRT, when the voltage of the G2 electrode is raised, the potential difference between the cathode and the G2 electrode increases and thereby the beam current increases, but the black level as well goes up at this moment. As distinct from this, in the Hi-Gm tube, when the voltage of the G2 electrode is raised, the potential difference between the cathode and the G2 electrode increases and thereby the beam current increases as in the case of the conventional CRT. However, since the threshold point at which the electron beam starts to flow towards the screen causing the screen to illuminate is determined by the voltage applied to the Gm electrode, the black level remains unchanged as long as the rise of the G2 electrode voltage is not so large. As a result, in the Hi-Gm tube, when the voltage of the G2 electrode is increased, the beam current increases accordingly with the black level being kept constant, and therefore, the effect of contrast enhancement can be obtained.

Accordingly, in the display apparatus of the second example including the Hi-Gm tube having the above-described characteristics, contrast can be increased by increasing a dc voltage input as the control signal into the G2 electrode voltage source 12 to increase the voltage applied to the G2 electrode 4. Likewise, it is possible to reduce contrast by reducing this dc voltage to reduce the voltage applied to the G2 electrode 4. This control signal may be a voltage signal output from an output port of a microcomputer when a user presses a key to adjust brightness, viewing a user-adjustment menu which is generated by a character generator or the like and displayed on the monitor screen. This control signal may be generated by other means such as a hardware including a microcomputer and switches, or software-based processing.

In the display apparatus of the second example, it is also possible to increase brightness of a picture in part by inputting a rectangular-wave signal which increases in amplitude for a certain period of time as the control signal into the G2 electrode voltage source 12. For example, it is possible to detect a low-brightness span from a video signal, and to increase the voltage applied to the G2 electrode for a period of time corresponding to this detected span, thereby increasing the brightness for that span. As described above, it is possible to boost a low-brightness span by controlling the G2 electrode voltage, which brings about an effect similar to gamma correction. Furthermore, when a picture includes a part to be displayed in high brightness such as a moving-image window, it is possible to superimpose a rectangular-wave signal on the G2 electrode voltage so that the G2 electrode voltage increases for that part and thereby the moving-image window is displayed in high brightness.

As previously described, in a conventional display apparatus, to adjust contrast, the gains of the three amplifiers for the three channels of R, G, and B have to be respectively controlled. As distinct from this, in the display apparatus of the second example, it is possible to adjust contrast by just controlling the voltage applied to the G2 electrode to control three electron beams of the three channels at once. Furthermore, in a conventional display apparatus, to achieve high-contrast display, expensive high-gain amplifiers and an expensive high-output-voltage power supply are required, whereas, in the second example, high-contrast display is achieved by a simple circuit without using such expensive amplifiers and an expensive power supply.

The above explained preferred embodiments are exemplary of the invention of the present application which is described solely by the claims appended below. It should be understood that modifications of the preferred embodiments may be made as would occur to one of skill in the art.

What is claimed is:

1. A CRT display apparatus comprising:

a CRT including an electron gun,
said electron gun having a cathode, a G1 electrode, a G2 electrode and a G3 electrode disposed in that order to draw electrons from said cathode, said electron gun further having a modulating Gm electrode disposed between said G2 and G3 electrodes; and a controller for controlling a value of a voltage applied to said Gm electrode to adjust brightness of a picture on a screen of said CRT.

2. A CRT display apparatus according to claim 1, in which said controller comprises a voltage source which produces a voltage having a value corresponding to a value of a brightness adjustment signal input to said voltage source, and applies said produced voltage to said Gm electrode.

3. A CRT display apparatus comprising:

a CRT including an electron gun,
said electron gun having a cathode, a G1 electrode, a G2 electrode and a G3 electrode disposed in that order to draw electrons from said cathode, said electron gun further having a modulating Gm electrode disposed between said G2 and G3 electrodes; and a controller for controlling a value of a voltage applied to said G2 electrode to adjust contrast of a picture on a screen of said CRT.

4. A CRT display apparatus according to claim 3, in which said controller comprises a voltage source which produces a voltage having a value corresponding to a value of a contrast adjustment signal input to said voltage source, and applies said produced voltage to said G2 electrode.

* * * * *